United States Patent [19]

Murayama et al.

[11] Patent Number: 4,686,573
[45] Date of Patent: Aug. 11, 1987

[54] CHARGE TRANSFER TYPE IMAGE PICKUP APPARATUS FOR PRODUCING FIELD-INTERLACED VIDEO SIGNALS

[75] Inventors: Jin Murayama; Ryuji Kondo; Hiroshi Tamayama; Takashi Yano; Makoto Shizukuishi, all of Kaisei, Japan

[73] Assignee: Fuji Photo Film Co., Ltd., Kanagawa, Japan

[21] Appl. No.: 824,873

[22] Filed: Jan. 31, 1986

[30] Foreign Application Priority Data

Feb. 5, 1985 [JP] Japan .................................. 60-19305

[51] Int. Cl.$^4$ .............................................. H04N 3/14
[52] U.S. Cl. ............................. 358/213.22; 358/213.29
[58] Field of Search .............................. 358/213, 212; 357/24 LR, 30

[56] References Cited

U.S. PATENT DOCUMENTS

| | | | |
|---|---|---|---|
| 4,489,423 | 12/1984 | Suzuki | 357/24 LR |
| 4,499,496 | 2/1985 | Tanaka et al. | 358/213 |
| 4,527,199 | 7/1985 | Kinoshita et al. | 358/213 |
| 4,539,597 | 9/1985 | Kinoshita et al. | 358/213 |
| 4,551,758 | 11/1985 | Masunaga et al. | 358/213 |

Primary Examiner—Gene Z. Rubinson
Assistant Examiner—Stephen Brinich
Attorney, Agent, or Firm—Birch, Stewart, Kolasch & Birch

[57] ABSTRACT

A solid-state image pickup apparatus of a charge transfer type includes a solid-state imaging device having an array of photosensitive cells with charge divider paths provided for sequentially receiving charges generated in the cells of a horizontal line to divide the charges into two groups for each pixel. For one of the two fields subjected to interlace scanning, charges generated in the cells of odd-numbered lines are transferred to its output port, and one of the two groups of charges for even-numbered horizontal lines adjacent to odd-numbered horizontal lines are discharged. Then, the output port effects addition with weight on the charges from the cells of the odd- and even-numbered lines to produce video signals of the odd-numbered lines. For the other field, on the other hand, charges generated in the cells of even-numbered lines are transferred to the output port, and one of the two groups of charges for odd-numbered horizontal lines are discharged. The output port in turn effects addition with weight on the charges from the cells of the even-numbered lines thus obtained to those of odd-numbered lines previously received to produce video signals of the even-numbered lines. Field flickering is adequately reduced and horizontal resolution of a picture is improved.

4 Claims, 12 Drawing Figures

Fig. 4

|  | FIELD A | | FIELD B | |
| --- | --- | --- | --- | --- |
|  | GATE 122 | GATE 124 | GATE 122 | GATE 124 |
| ODD-NUMBERED ROW | CLOSED | OPEN | OPEN | CLOSED |
| EVEN-NUMBERED ROW | OPEN | CLOSED | CLOSED | OPEN |

CHARGE TRANSFER TYPE IMAGE PICKUP APPARATUS FOR PRODUCING FIELD-INTERLACED VIDEO SIGNALS

BACKGROUND OF THE INVENTION

1. Field of the Invention

The present invention relates to a solid-state image pickup apparatus, and in particular, to a solid-state image pickup apparatus of the charge transfer type which delivers video signals according to the interlaced scanning whereby each frame includes two fields.

2. Description of the Related Art

In a solid-state image pickup device of so-called interline transfer type, for example, photocarriers generated in photosensitive cells arranged in a matrix array on a light receiving surface thereof are first moved to vertical transfer paths constructed in a charge coupled device (CCD) structure so as to be transferred in a vertical direction; next, the photocarriers are fed to a horizontal transfer path also in the CCD structure to be transferred in a horizontal direction, thereby delivering these photocarriers in the form of video signals.

In the standard television systems such as the NTSC, for example, raster scanning video signals are configured according to the two-field for one-frame interlaced scanning process. When using the solid-state image pickup device of the interline transfer type in the ordinary television system, so-called frame and field signal store systems are applicable.

For example, if the frame signal store system is adopted in the interline transfer process, photocarriers generated by the light incident on the photosensitive cells during a 1/30-second frame period are delivered to the vertical transfer paths. In a case of the field store system, such photocarriers generated in the cells during a 1/60-second field period are moved to the vertical transfer paths. When using the interlaced scanning process together with the frame signal store system, video signals of an odd-numbered horizontal line and those of an even-numbered horizontal line are alternately read out for every consecutive two fields. That is, for the video signals of this system, different portions of an image are contained in fields A and B, respectively; and hence a field flicker noise is caused to occur. This adverse effect becomes considerable especially when reproducing a still picture from video signals of an image moving at a high speed.

In the field signal store system, on the other hand, video signals of an odd-numbered line and those of an even-numbered line are read out after being alternately subjected to addition for each field. The addition is conducted in such a fashion that video signals of lines or rows n and n+1 are added for a field and those of rows n−1 and n are added for the other field. Consequently, image information is averaged between the adjacent horizontal rows, which leads to a disadvantage that the vertical resolution of an image is deteriorated.

SUMMARY OF THE INVENTION

It is therefore an object of the present invention to provide a solid-state image pickup apparatus of the charge transfer type which minimizes the field flicker noise with a relatively high resolution, thereby eliminating the prior art disadvantages.

According to the present invention, there is provided a charge transfer type solid-state image pickup apparatus comprising a solid-state image pickup device having a photosensitive cell array including a plurality of photosensitive cells arranged in an array, and first control means for effecting a clock drive on the solid-state image pickup device to cause the latter to deliver two fields of video signals subjected to interlaced scanning. The solid-state image pickup device includes charge divide means for sequentially receiving charges generated in photosensitive cells of a horizontal line to divide the charges into two groups for each pixel, discharge means for discharging one of the two groups of charges, and output means responsive to the first control means for sequentially receiving charges from the divide means to sequentially produce video signals of a horizontal line. The solid-state image pickup apparatus further includes second control means for controlling the charge divide means and the discharge means. The first control means effects a clock drive on the charge divide means to sequentially transfer charges from the photosensitive cells, and the second control means controls the charge divide means and the discharge means, so that, for one of the two fields subjected to interlaced scanning, charges generated by the photosensitive cells of odd-numbered horizontal lines are transferred to the output means, and one of the two groups of charges for even-numbered horizontal lines adjacent to odd-numbered horizontal lines are discharged by the discharge means so that the output means effects addition with weight on charges from the photosensitive cells of the odd- and even-numbered horizontal lines to produce video signals of the odd-numbered horizontal lines; and for the other of the two fields, charges generated by the photosensitive cells of even-numbered horizontal lines are transferred to the output means and one of the two groups of charges for odd-numbered horizontal lines adjacent to the even-numbered horizontal lines are discharged by the discharge means so that the output means effects addition with weight on charges from the photosensitive cells of the even- and odd-numbered horizontal lines to produce video signals of the even-numbered horizontal lines.

BRIEF DESCRIPTION OF THE DRAWINGS

The objects and features of the present invention will become more apparent from the consideration of the following detailed description taken in conjunction with the accompanying drawings in which:

FIG. 4 shows a truth table outlining operation logic of the gate control of FIG. 1.

DESCRIPTION OF THE PREFERRED EMBODIMENT

Referring to the accompanying drawings, an embodiment of the solid-state image pickup apparatus according to the present invention will be described.

Figure 1:
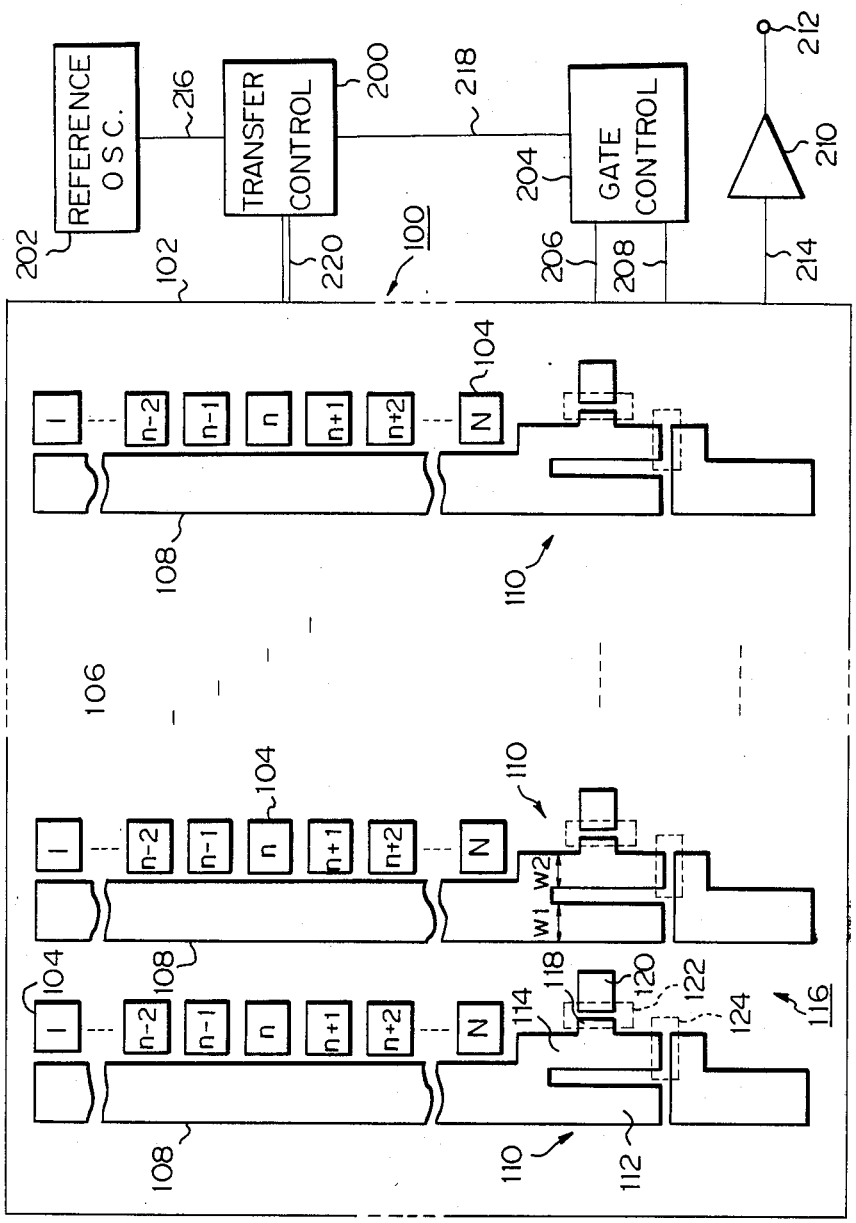
FIG. 1 is a schematic block diagram conceptually illustrating an embodiment of the charge transfer type solid-state image pickup apparatus according to the present invention.

In FIG. 1, a solid-state image pickup device 100 in the illustrative embodiment is of the charge coupled type in which a charge transfer area is conceptually depicted for easy understanding of the present invention. Consequently, the electrodes of transfer gates not directly related to the understanding are not shown.

The solid-state image pickup device 100 comprises a plurality of photosensitive cells 104 arranged in a matrix array on a primary surface of a semiconductor chip 102, thereby forming a photosensitive cell array 106 having N horizontal rows or lines and M vertical columns, where M and N are natural numbers. The photosensitive cells 104 are configured in a charge coupled device (CCD) structure to generate photocarriers according to the light incident on the array 106 and to temporarily store the photocarriers therein. For simplifying the figure, only cells of columns 1, 2, and M numbered from the left-most column and rows n−2 to n+2 centered on row n are shown in FIG. 1, where n is a natural number not exceeding N.

On the left of each vertical column, a vertical transfer path (VCCD) 108 of the CCD structure is disposed. Under the control of a transfer gate (not shown) between the photosensitive cells 104 and the path 108, the vertical transfer path 108 develops a function to receive photocarriers from the photosensitive cells 104 to transfer the photocarriers in the vertical direction, namely, from the top to the bottom in the embodiment of FIG. 1.

The control of the transfer gate and the drive of the vertical transfer path 108 are effected in response to a gate drive signal and a multiphase transfer clock supplied from a transfer control circuit 200 connected to the device 100. Control timing therefore is established in the transfer control circuit 200 by use of a reference clock delivered from a reference oscillator 202 connected to the transfer control 200.

As can be seen from FIG. 1, the vertical transfer path 108 has a bottom end connected to a charge divide section 110 having two transfer paths, namely, branches 112 and 114. Both branches 112 and 114 each have a bottom end connected to a horizontal transfer path (HCCD) 116 which is also of the CCD structure. The branch 114 comprises a branch 118 at an intermediate position thereof and a discharge drain 120 opposing the branch 118 as shown in the figure.

A discharge gate 122 is disposed on the chip 102 between the branch 118 and the discharge drain 120 to control delivery of charges from the branch 118 to the drain 120. In addition, a connecting gate 124 is disposed on the chip 102 between a bottom end of the branch 114 and the horizontal transfer path 116 so as to control transfer of charges from the branch 114 to the horizontal transfer path 116.

The two gates 122 and 124 are controlled by a gate control 204. That is, in timed with the transfer control 200, the gate control 204 alternately enables the gates 122 and 124 via control lines 206 and 208, respectively, which will be described later.

The horizontal transfer path 116 is a CCD for receiving charges sequentially transferred from the charge divide circuit 110 associated with each vertical column to transfer the charges in the horizontal direction, namely, from the left to the right in the embodiment of FIG. 1.

The transfer operation is controlled by the transfer control 200. The charges thus sequentially transferred are delivered in the form of video signals from an output section via a preamplifier 210 to an output terminal 212.

On the other hand, it has been well known that the amount of charges delivered from a single charge transfer path to a plurality of branch paths is proportional to the capacity of the branch paths. The capacity depends on the impurity concentration of a depletion layer constituting a branch path in the MOS structure, thickness of an insulation layer on the depletion layer, and voltage applied to an electrode layer on the insulation layer. Consequently, if the values of these factors are the same for a plurality of branch paths, the amount of charges fed to a branch path depends on the cross-sectional area of the branch path. If the depths of depletion layers formed are the same, the amount of charges delivered to a depletion layer is proportional to the geometric width of the depletion layer.

In this embodiment, when designing the image pickup device 100, width W1 of the branch 112 and width W2 of the branch 114 are controlled to adjust the ratio of the charges transferred from the vertical transfer path 108 to the branch 112 to those transferred from the path 108 to the branch 114. That is, assuming that the value of charge division ratio $W2/(W1+W2)$ is represented by W, an amount of charges obtained by multiplying by W the charges transferred through the vertical transfer path 108 are delivered to the branch 114. The value W may naturally range from 0 to 1 depending on the design of the charge divided section 110.

The gate control 204 energizes the control lines 206 and 208 according to the truth table as shown in FIG. 4. The transfer control 200 performs interlaced scanning in consecutive fields A and B in this embodiment so as to drive the photosensitive cells 104 and the vertical transfer path 108 of the photosensitive cell array 106.

In more detail, the charges stored in the photosensitive cells 104 are moved to the respective vertical transfer paths during the period of field A. The charges are used in the form of the image signals of pixels, namely, pixel signals associated with the photosensitive cells 104. For each row, the charges delivered to the vertical transfer path 108 are sequentially shifted to the lower row at a time so as to be fed to the charge divide section 100. Synchronous with the transfer operation, the gate control section 204 enables the control lines 206 and 208 to open or close gates 122 and 124 as shown in FIG. 4 with respect to the field A. More specifically, the transfer control 200 effects a clock drive on the vertical transfer path 108 to sequentially transfer charges therefrom to the charge divide section 110. The transfer control 200 performs counting by use of a row counter to determine a row to which the charges transferred to the charge divide section belong.

Figure 2:
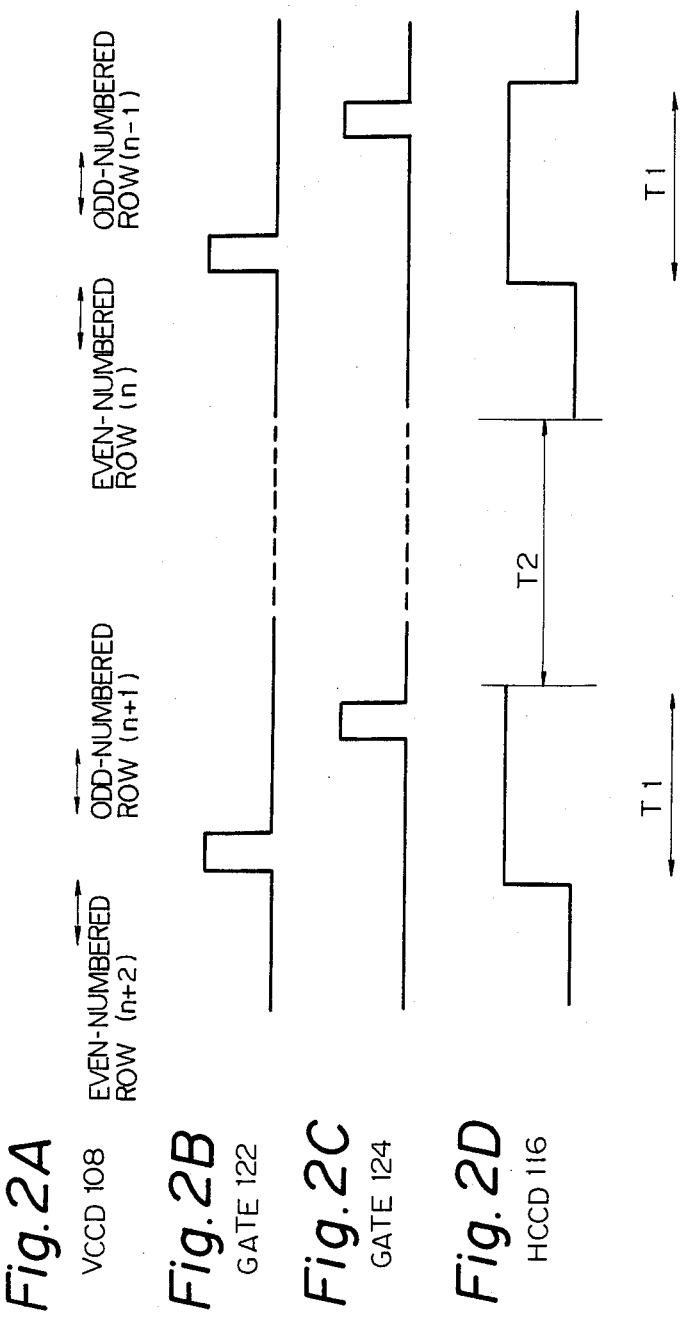
FIGS. 2A–2D and 3A–3D are timing charts useful for understanding operations of the embodiment of FIG. 1 in fields A and B, respectively.

As shown in FIGS. 2A, 2B and 2C, when charges of an even-numbered row are transferred from the vertical transfer path 108 to the charge divide section 110, the gate control 204 identifies that the charges belong to the even-numbered line based on a signal from the transfer control circuit 200, and hence it energizes the control line 206 but leaves the control line 208 de-energized. As a consequence, the gate 122 is opened, whereas the gate 124 remains closed. Charges delivered to the branch 114 are then transferred to the discharge drain 120 so as to be discharged therefrom.

Similarly, when charges of an odd-numbered row are transferred to the charge divide section 110, the gate control 204 energizes the control line 208 leaving the control line 206 not energized. Consequently, the gate 124 is opened with the gate 122 kept closed. The charges delivered to the branch 114 are entirely transferred to the horizontal transfer path 116 together with the charges fed to the branch 112 to be temporarily stored therein. As can be understood from the foregoing description, the amount of charges of the even-numbered line is 1−W times that of the odd-numbered line.

As shown in FIG. 2D, when charges are transferred from the charge divide section 110 to the horizontal transfer path 116 during a period T1, the charges of the adjacent two rows are added under the control of the transfer control 200. For the field A as described above, the charges of an even-numbered row are first transferred to and temporarily stored in the horizontal transfer path 116. Next, the charges of the subsequent odd-numbered row are delivered to and temporarily stored in the horizontal transfer path 116. These operations cause the latter charges to be added to the former charges.

The charges thus resulting from an addition conducted between two rows in the horizontal transfer path 116 are sequentially transferred toward an output port 214 during a horizontal transfer period T2 so as to be fed in the form of video signals of the odd-numbered row associated with the field A. Since the amount of charges of an even-numbered row is 1−W times that of an odd-numbered row as described above, the video signals thus delivered for the odd-numbered row contain those of the odd-numbered row and those resulting from multiplying by 1−W the video signals of the even-numbered row just above the odd-numbered row. In this manner, the same addition with weight is achieved for the charges of all horizontal rows of the field A to generate the video signals of the odd-numbered lines, which are in turn sequentially developed from an output terminal 212.

Figure 3:
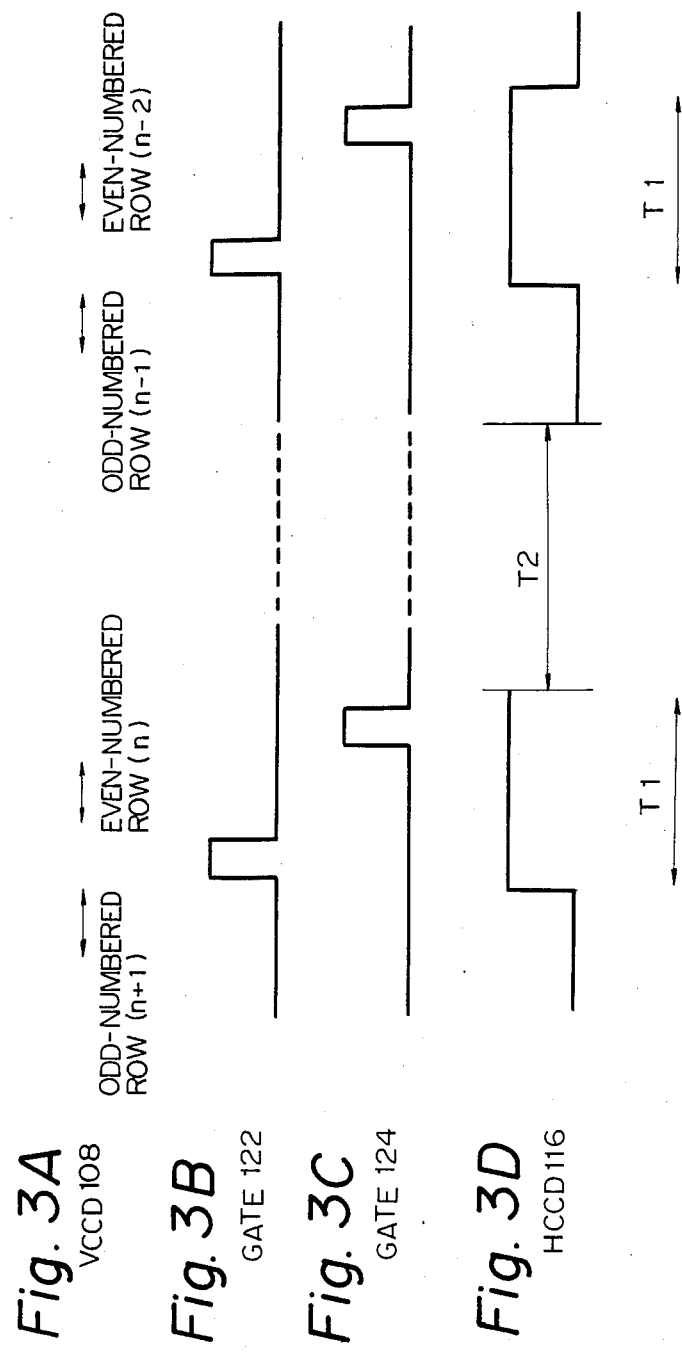

For the succeeding field B as shown in FIG. 3, a similar operation to that conducted for the field A is carried out according to the logic of FIG. 4 to be applied to the field B. That is, among the charges of an odd-numbered row, those associated with the branch 112 are transferred to the horizontal transfer path 116, whereas the charges of an even-numbered row succeeding the odd-numbered row are fed to the horizontal transfer path 116 via the branches 112 and 114. Among the charges of the odd-numbered row, consequently, those delivered to the branch 114 are transferred to the discharge drain 120 to be discharged therefrom, and hence the amount of charges of the odd-numbered row is 1−W times that of the even-numbered row. As a consequence, the video signals of an even-numbered row in the field B contain those of the even-numbered row with video signals added which are obtained by multiplying by 1−W the video signals of the preceding odd-numbered row. In this fashion, the same addition with weight is performed for the charges of all horizontal rows of the field B to generate the video signals of the even-numbered row, which are then produced from the output terminal 212.

In an ordinary field signal store system, charges of corresponding pixels included in two successive rows are added to each other in a vertical transfer path. In this embodiment, however, the addition is not generated in the vertical transfer path 108. That is, for the signals of each pair of two rows, the amount of charges are adjusted in accordance with a ratio of 1:W by pixel by pixel in the charge divide section 110, and then the charges are added between both of the corresponding pixels in the horizontal transfer section 116.

As can be seen from the foregoing description, when the division ratio w is set to 0, the charge division through the branch 114 is not effected, so that the device 100 can be used in the ordinary field signal store system. Consequently, although the resolution is rather low, the flicker noise will be minimized. When the ratio w is set to 1, the charges of every second rows are entirely discharged from the discharge drain 120, and hence the device 100 will be operated in the ordinary frame signal store system. As a consequence, although a high resolution is developed, the flicker noise cannot be reduced. The store time is 1/60 second in this case, whereas it is 1/30 second in the ordinary frame signal store system.

Figure 5:
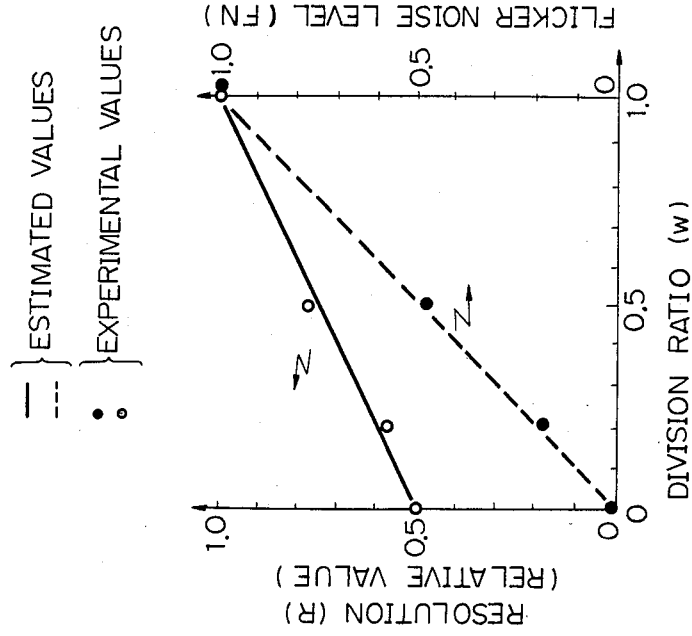

FIG. 5 plots relative resolutions R and flicker noise levels FN on the left and right ordinates, respectively, versus division ratio w on the abscissa, which were estimated and experimentally measured on the solid-state imaging device 100. When division ratio w is unit, the device 100 works as a frame-storage type of image sensor, and develops the resolution R of unit. In the example, the resolution is understood as between adjacent two horizontal lines of a reproduced image. Overlapping portions of corresponding pixels between adjacent horizontal lines deteriorate the vertical resolution. Therefore, if division ratio w is zero, then the device 100 functions as a field-storage type of image sensor to develop the resolution which is half as much as of the frame-storage type, i.e. $R = \frac{1}{2}$. Therefore, as shown in FIG. 5, the resolution may approximately be represented by the expression:

$$R = (1+w)/2. \qquad (1)$$

Flicker noise, which is one of the factors deteriorating the image quality of a reproduced picture, is caused by the fact that the interlacing scanning raises difference in timing for storing the signals of horizontal lines between the corresponding pixels of the adjacent lines by half as much as the period of time for storage. Accordingly, if division ratio w is null, then flicker noise level FN is null as in the case of the field storage fashion, and on the other hand if division ratio w is unit, then flicker noise level FN is unit as in the case of frame storage. Consequently, as plotted in FIG. 5, flicker noise may approximately be represented by the following expression:

$$FN = w. \qquad (2)$$

When estimating the image quality of a picture reproduced, it is a matter of interest on which importance is made, resolution or flicker noise level, in order to determine an overall performance index M on a reproduced picture. An overall performance index M may approximately be expressed by the formula:

$$M = A \times R - FN, \qquad (3)$$

where A represents a weight to be added for estimating an overall performance index M on the basis of resolution and flicker noise.

From the above-mentioned expressions (1), (2) and (3), we then obtain $$M = [1 + (A-1)w]2. \qquad (4)$$

Figure 6:
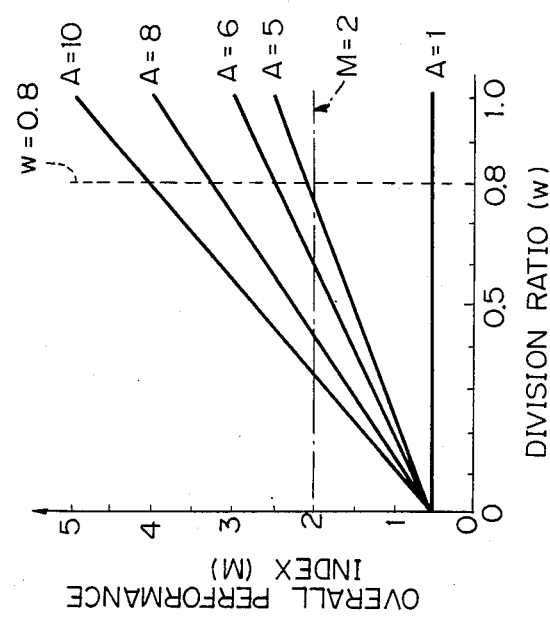
FIGS. 5 and 6 plot characteristics of an image pickup device when the charge division ratio of the charge divide section is changed in a range from 0 to 1 in the embodiment of FIG. 1.

The expression (4) is plotted in FIG. 6 for the various values of weight A as a parameter.

Experimentally, the value of flicker noise level itself is understood preferable which is equal or less than 0.8 in terms of image quality of a reproduced picture. Weight A may appropriately be selected in the range between 5 and 10, and overall characteristic index M may appropriately be selected equal or more than two. This follows from FIG. 6 that weight W may appropriately be selected in the range of 0.2 through 0.8, and more preferably 0.4 through 0.6.

The embodiment has been described to explain the present invention and does not necessarily limit the present invention. The change or modification that can be made by those skilled in the art without departing from the spirit of the present invention are included in the scope of the present invention. For example, although the embodiment is of the interline transfer type, the present invention can be advantageously applied also to a CCD image pickup device of the frame transfer type in such a fashion that the video signals of a pair of horizontal rows are subjected to an operation in which the video signals of one of the rows is added with weight to those of the other row to generate the video signals thereof, and that the operation is alternately achieved for each field.

According to the present invention, for one of two fields subjected to interlaced scanning, the video signals of an even-numbered row or line are added with weight to those of an odd-numbered row or line to generate the video signals of the odd-numbered row, and for the other field thereof, the video signals of an odd-numbered row are added with weight to those of the even-numbered row to generate the video signals of the even-numbered row. The video signals of any field, therefore, include those of the other field according to a preset weight; so that a picture can be reproduced with resolution and flicker noise favorably balanced.

While the present invention has been described with reference to the particular illustrative embodiment, it is not restricted by the embodiment but only by the appended claims. It is to be appreciated that those skilled in the art can change or modify the embodiment without departing from the scope and spirit of the present invention.

What is claimed is:

1. A solid-state image pickup apparatus of a charge transfer type comprising:
    a solid-state image pickup device having a photosensitive cell array including a plurality of photosensitive cells arranged in an array; and
    first control means for effecting a clock drive on said solid-state image pickup device to cause said device to deliver two fields of video signals subjected to interlaced scanning,
    said solid-state image pickup device including:
    charge divide means for sequentially receiving charges generated in photosensitive cells of a horizontal line, a plurality of charges associated with each pixel, to divide the plurality of charges of each pixel into two groups;
    discharge means for discharging one of the two groups of charges; and
    output means responsive to said first control means for sequentially receiving charges from said charge divide means to sequentially produce video signals of a horizontal line,
    said solid-state image pickup apparatus further including second control means for controlling said charge divide means and said discharge means,
    said first control means effecting a clock drive on said charge divide means to sequentially transfer charges from said photosensitive cells, and said second control means controlling said charge divide means and said discharge means, so that,
    for one of said two fields subjected to interlaced scanning, charges generated by said photosensitive cells of odd-numbered lines are transferred to said output means, and one of the two groups of charges for even-numbered horizontal lines adjacent to odd-numbered horizontal lines are discharged by said discharge means so that said output means effects addition with weight on charges from said photosensitive cells of the odd- and even-numbered horizontal lines to produce video signals of the odd-numbered horizontal lines, and
    for the other of the two fields, charges generated by said photosensitive cells of even-numbered horizontal lines are transferred to said output means, and one of the two groups of charges for odd-numbered horizontal lines adjacent to the even-numbered lines are discharged by said discharge means so that said output means effects addition with weight on charges from said photosensitive cells of the even- and odd-numbered horizontal lines to produce video signals of the even-numbered horizontal lines.

2. An apparatus according to claim 1 wherein,
    said solid-state image pickup device includes vertical transfer means responsive to said first control means for transferring charges from said photosensitive cells in an interline transfer fashion to said charge divide means,
    said output means including horizontal transfer means disposed at an output terminal of said charge divide means and responsive to said first control means for sequentially transferring charges of pixels of a horizontal line, said addition being effected by said horizontal transfer means.

3. An apparatus according to claim 2 wherein,
    said charge divide means includes a first transfer path for transferring a portion of the charges received from said vertical transfer means, and a second transfer path for dividing the rest of the charges to transfer the divided charges,
    said first transfer path having an output terminal connected to said horizontal transfer means,
    said second transfer path having a first output terminal connected to said horizontal transfer means and a second output terminal connected to said discharge means,
    said discharge means including first gate means disposed between said first output terminal and said horizontal transfer means, and second gate means disposed between said second output terminal and said charge discharge means,
    said second control means opening and closing said first and second gate means to control discharge operation of said discharge means and transfer operation of said horizontal transfer means.

4. An apparatus according to claim 3 wherein said first and second transfer paths have a width of transfer path defining a ratio of the charges which are divided and transferred to said first transfer path to the charges which are divided and transferred to said second transfer path.

* * * * *